United States Patent
Pennerath

(10) Patent No.: US 7,323,077 B2
(45) Date of Patent: Jan. 29, 2008

(54) AUTOMATED METHOD OF PREPARING AND PRODUCING PULL TABS AND A PROTECTIVE FILM AND AN EXTRUDED SECTION HAVING A PROTECTIVE FILM COMPRISING PULL TABS OF SAID TYPE

(75) Inventor: Eddy Pennerath, Henriville (FR)

(73) Assignee: Rehau SA, Morhange (FR)

( * ) Notice: Subject to any disclaimer, the term of this patent is extended or adjusted under 35 U.S.C. 154(b) by 390 days.

(21) Appl. No.: 10/513,634

(22) PCT Filed: May 6, 2003

(86) PCT No.: PCT/FR03/01398

§ 371 (c)(1),
(2), (4) Date: Jan. 24, 2005

(87) PCT Pub. No.: WO03/095577

PCT Pub. Date: Nov. 20, 2003

(65) Prior Publication Data

US 2005/0126695 A1    Jun. 16, 2005

(30) Foreign Application Priority Data

May 7, 2002   (FR) ................................. 02 05734

(51) Int. Cl.
*B32B 37/00* (2006.01)
(52) U.S. Cl. .................... 156/242; 156/250; 156/256
(58) Field of Classification Search ........... 156/242, 156/250, 256, 257, 266, 268, 304.1, 304.2, 156/304.6, 308.2
See application file for complete search history.

(56) References Cited

U.S. PATENT DOCUMENTS

| 2,474,013 | A | | 6/1949 | Rawls |
| 5,944,357 | A | * | 8/1999 | Instance ..................... 283/101 |
| 6,820,382 | B1 | * | 11/2004 | Chambers et al. ............. 52/232 |
| 2003/0201064 | A1 | * | 10/2003 | Treleaven et al. .......... 156/250 |

FOREIGN PATENT DOCUMENTS

| FR | 2 679 845 A | 2/1993 |
| FR | 2 813 873 A | 3/2002 |
| WO | WO 01 14489 A | 3/2001 |

* cited by examiner

*Primary Examiner*—James Sells
(74) *Attorney, Agent, or Firm*—Davis Bujold & Daniels, P.L.L.C.

(57) ABSTRACT

According to the invention, the section (2) comprises a double-sided adhesive strip (8) which is covered with a protective film (11). The aforementioned protective film (11) is removed by way of a pull tab (12) before gluing, the tab consisting of two tab parts (15) which are positioned on either side of a slit (16) in the film. The automated method comprises, in the extrusion line, a step whereby the pull tab (12) is joined to the adhesive-covering protective film in the middle of the adhesive area transversely to the section. The tab and the protective film are subsequently cut in order to produce two tab parts which are each connected to the end of one length of protective film (18) which is intended to be torn off. The invention is particularly suitable for use in the car industry and in building and for producers and users of extruded sections which are glued using double-sided adhesive.

6 Claims, 3 Drawing Sheets

AUTOMATED METHOD OF PREPARING AND PRODUCING PULL TABS AND A PROTECTIVE FILM AND AN EXTRUDED SECTION HAVING A PROTECTIVE FILM COMPRISING PULL TABS OF SAID TYPE

The instant invention concerns an automated method of positioning and producing pull tabs to facilitate gripping the end of, and thereafter removing, a film protecting an adhesive strip covering an extruded section that will then be assembled using a soldering or molding process or the like to form an angle.

It also concerns an extruded section comprising an adhesive strip covered with a protective film equipped with at least one pull tab to facilitate removal of the strip and which can be positioned using the automated process of the invention.

More generally, it concerns any element, linear or non-linear, to be attached to a surface using an adhesive strip covered with a protective film that must be removed before gluing by means of a pull tab.

This invention is particularly well-suited to use with extruded frames designed to surround the perimeter of a fixed window such as a windshield, for example, or a rear or back window in an automobile or other vehicle. It may also apply to glued sections used for sealing, protection or for esthetic purposes on windows, panels, vehicle body rims, metal cross pieces, or the like in the automobile, transportation, or construction industry, or any other domain.

Certain sections for covering and/or sealing fixed windows, also known as enhancers for windshields, rear windows, or the like, are attached to the window periphery with double-face adhesive, usually in the form of a strip.

These sections are generally formed continuously using extrusion. The strip of double-face adhesive is then applied automatically in the extrusion line onto the section, with one of its adhesive surfaces adhering to the attachment surface of the section.

In order to protect the adhesive until it is time to glue the section onto the periphery of a fixed window, for example, the other surface of the adhesive strip is conventionally covered with a protective film. Since the double-face adhesive usually remains in place with the protective film already attached to one of its surfaces, this protective film is on the strip at the time it is applied to the section. Thus, it is automatically positioned on the section in the extrusion line, simultaneously with the adhesive strip.

These sections are next cut into lengths and then into portions, or more often, they are first formed into frames according to application they are destined for.

The frames are formed by assembling several section portions of identical or different lengths, joined by angle connectors, for example, by soldering or molding. The number and length of the section portions, the angle joints, and the general shape of the resulting frame are selected so as to be suitable for the intended application of the frame.

Most often these frames consist of three section portions, two lateral and one upper, or of four section portions, two lateral, one upper and one lower, joined at their extremities using a soldering or molding process.

To facilitate removal of the protective film before the frame is attached, the pull tabs are usually glued or soldered to the protective film covering the adhesive. In this way the user can easily grasp the free end of these tabs and pull perpendicular to the gluing surface in order to detach the film from the adhesive surface.

In order to be effective, such a pull tab must be positioned, essentially at the extremity of the protective film. In fact, the film is often stuck so tightly to the adhesive strip that it is necessary to peel it off using perpendicular force applied at the extremity of the film to be detached. A pull tab located in the middle of the adhesive area is not a simple or convenient means of removing the protective film.

At present the operation of gluing pull tabs is manual and has not yet been automated.

Therefore, since they must be placed at the end of the adhesive, the tabs must be positioned after the soldering or molding step that corresponds to forming the angles because the presence of pull tabs at the junction zone would interfere with this operation. However, automatically positioning the tabs after the soldering or molding step would require manipulating the completed frames, which is a difficult operation to automate.

Furthermore, if the tabs are to be positioned during extrusion, which would be technically much easier to perform automatically, it would be necessary to position them in the middle of the adhesive zone to avoid interfering with the subsequent assembly operations. As pointed out previously, the ultimate removal of the protective film then becomes very difficult.

The goal of the invention is to propose a method for positioning and forming pull tabs that allows the film protecting the adhesive to be simply and quickly detached thereafter, a method that can be easily automated and poses no problems during the subsequent steps of transforming the section.

To resolve this technical problem, the invention teaches an automated method for positioning and forming pull tabs that facilitates the subsequent removal of a protective film covering the free surface of a strip of double-face adhesive extending along a continuously extruded portion, said tabs comprising one portion for attachment to the protective film and one free extremity.

The method comprises the following steps:

attaching a pull tab to the protective film, in the middle of the adhesive zone and transversely in relation to the section so that its free extremity extends laterally beyond the adhesive;

cutting the pull tab and the protective film so as to individualize the pull tab and the protective film in the same place and obtain two pull tab sections, each connected to the extremity of a length of protective film that will be detached.

The pull tab is preferably glued or soldered to the protective film covering the adhesive.

Cutting the pull tab and the protective film preferably takes place essentially near the middle of the pull tab. Two half-tabs are then formed, each connected to the end of a length of protective film that will be removed.

The attachment and cutting steps take place on the extrusion line before the eventual steps of assembling the section by molding, soldering, or the like. As they are particularly simple and can be performed continuously, a person skilled in the art can easily conceive of methods of automating the steps using devices available in the industry.

The pull tabs, having been positioned in the middle of adhesive zone and not at the end, do not interfere with subsequent assembly operations, for example, soldering or molding.

Furthermore, the two half-tabs allow quick, effortless removal of the protective film, and since they have been cut out, they are located at the end of a length of film. Additionally, because they extend laterally, the film can be satisfactorily removed.

Removing two lengths of film is not really a disadvantage, since this operation can even be accomplished in one motion. On the contrary, it is actually an advantage when the section is being positioned because it allows the user to first pull back a first length of film to position the section precisely, for example, around the angles, without being disturbed by the rest of the section accidentally sticking, since the adhesive is still protected by the other length of film.

The solution offered by the invention is particularly advantageous because it eliminates the high cost of manual positioning. This is a substantial saving, given that each frame portion has one or even two pull tabs.

The invention also teaches the use of a film to protect a double-face adhesive strip characterized in that it comprises at least one pull tab connected to the protective film in the middle of the adhesive zone and transversely in relation to the film, and in that the pull tab is a double tab composed of two tab portions juxtaposed on either side of a slit in the protective film, each of these pull tab portions being attached essentially at the extremity of one of these lengths.

The instant invention also describes a section and a frame equipped with a protective film of this type.

Other characteristics and features of the invention will be apparent from reading the following detailed description, with reference to the attached drawings, wherein.

Figure 1:
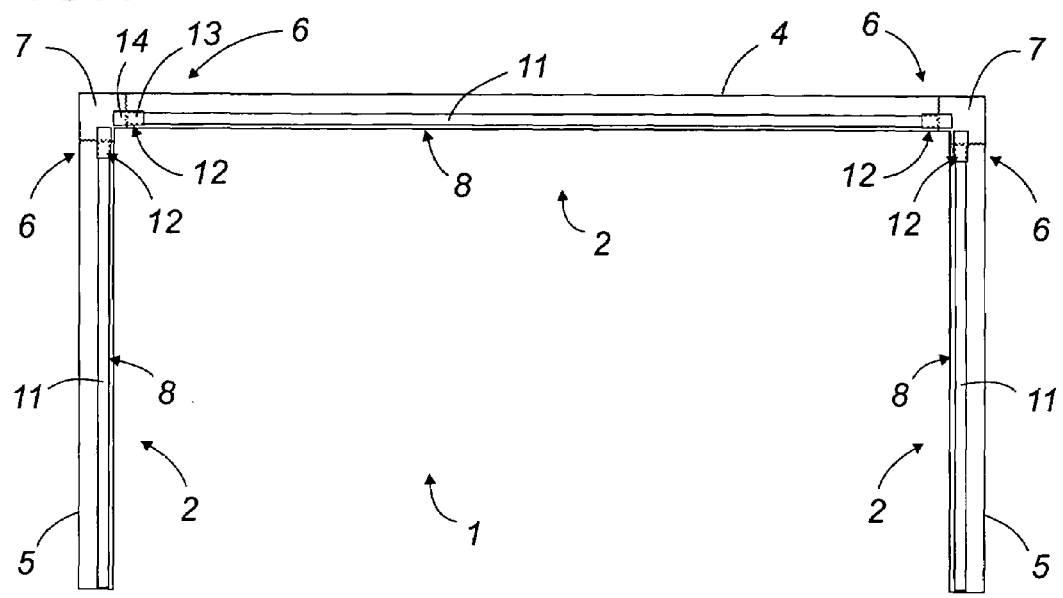
FIG. 1 is a schematic view of the back of a frame according to the prior art designed to be glued using double-face adhesive.

The device and method of the invention will now be described in detail with reference to FIGS. 1 through 7. Equivalent elements shown in different drawings will bear the same reference numerals.

Throughout this application, the "front surface" of the section or the frame will conventionally denote the surface of the section or frame that will be visible once the section or frame has been positioned; and the "back surface" of the section or frame will denote the surface of the section or frame comprising the adhesive strip, that is, the surface that will be hidden once the section or frame has been positioned.

In the various drawings, frame 1 is shown, forming a covering seal for a windshield and constituting one example of a preferred application of the invention. However, it should be understood that these drawings, as well as the detailed description of the drawings, in no way limit the scope of the invention defined by the claims.

The covering seal 1 that is shown consists of several section portions 2, also called ribs, joined together so as to constitute a perimeter seal designed to surround a fixed window 3, for example.

This covering frame 1 may surround the entire perimeter of window 3 or only part of it. In the case of a windshield, it generally does not extend for the entire periphery. The lower edge of it generally remains free, since it is hidden by the end of the hood.

Figure 2:
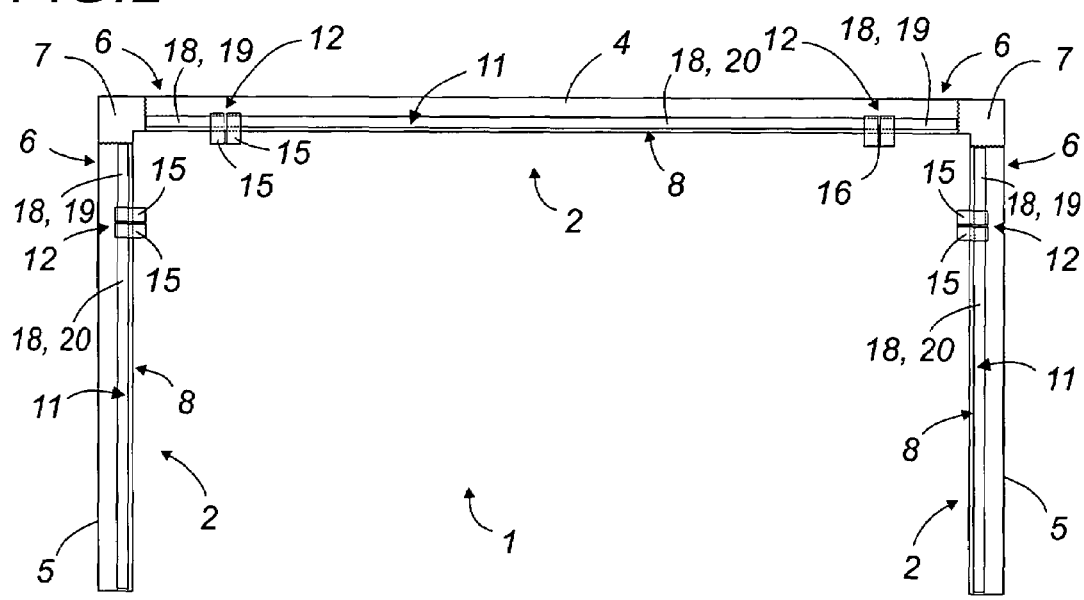
FIG. 2 is a schematic view of the back of a frame according to the invention.
Figure 3:
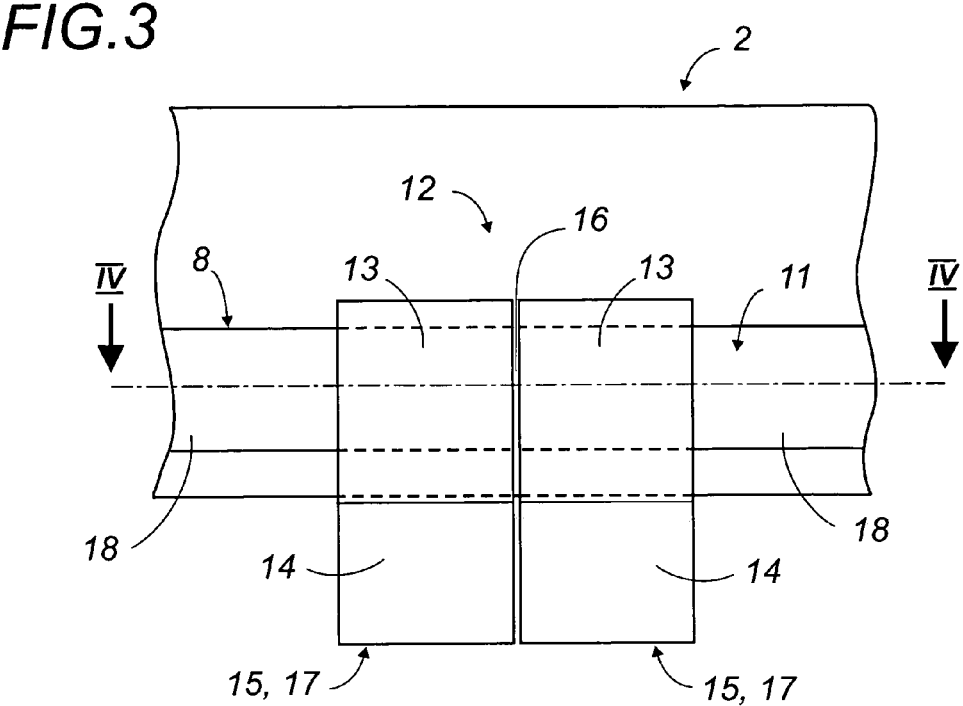
FIG. 3 is an enlargement of a portion of the frame shown in FIG. 2, corresponding to the gluing area of double pull tab according to the invention.
Figure 4:
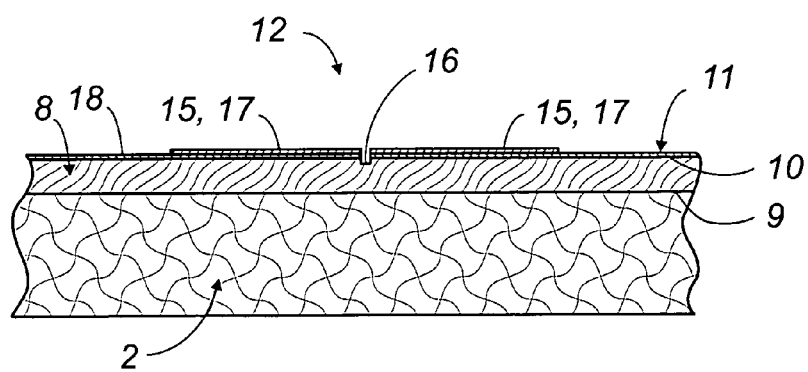
FIG. 4 is a longitudinal cross-section along lines IV-IV of the section portion shown in FIG. 3.
Figure 5:
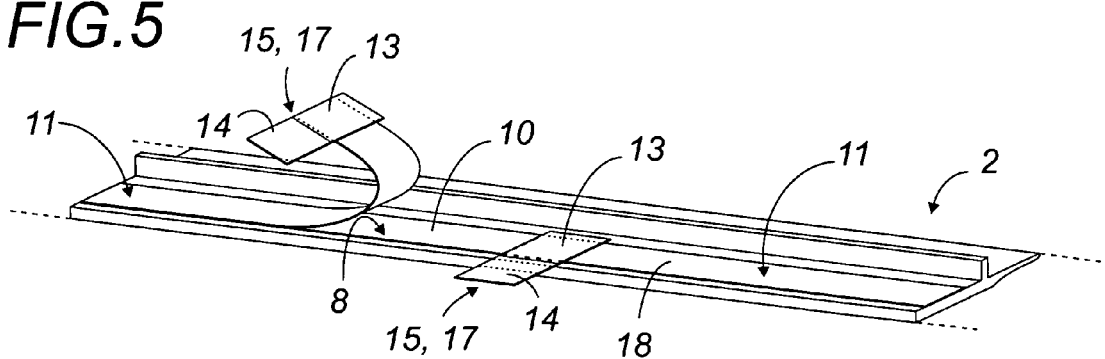
FIG. 5 is a perspective of the back of a section portion according to the invention, with the pull tab partially unglued.

In FIGS. 1 and 2, covering frame 1 is essentially rectangular and comprises one essentially horizontal section portion or rib 4 and two essentially vertical section portions or ribs 5 so that it frames three sides of the windshield.

Obviously, without exceeding the scope of the invention, the frame of the invention might consist of a different number of section portions and/or be formed differently to adapt to the window, panel, or rim it is designed to equip.

Conventionally these three section portions 2 are connected two by two at their adjacent extremities 6 by an angle connector 7 made by molding.

These two portions 2 may also be joined by soldering their adjacent extremities 6 after bisecting them by 45° or by some other suitable method.

In order for it to be glued into place for use, frame 1 comprises an adhesive material in the form of a double-face adhesive strip 8 extending along the back surface of each section portion 2.

Each of these double-face adhesive strips 8 comprises one surface 9 that is applied to the back surface of the section portion and attached to it just after extrusion of the section, and one unattached surface 10 protected by a protective film 11.

Protective film 11 protects unattached surface 10 of adhesive 8 until the moment frame 1 must be glued into position for use.

To facilitate the subsequent removal of film 11 for positioning frame 1, each strip of protective film 11 comprises at least one pull tab 12.

This pull tab 12 comprises one portion 13 for attachment to the protective film and it is applied to and joined to the film by gluing, soldering, or some other appropriate means.

Pull tab 12 also comprises one unattached extremity 14 which is used to grip tab 12 and exert a pull on it to detach protective film 11.

According to the prior art, as shown in FIG. 1, pull tabs 12 are conventionally disposed longitudinally at at least one of the extremities of each strip of double-face adhesive and thus on each section portion. The frame shown in FIG. 1 comprises four pull tabs 12 disposed at extremities 6, near molded angles 7.

According to the invention and as shown in FIGS. 2 through 5, pull tabs 12 are positioned transversely to protective film 11, with their unattached end 14 extending laterally beyond adhesive 8. Moreover, they are located along the length of the section, in the middle of the adhesive area.

According to a preferred embodiment, pull tabs 12 of the invention are placed at about ten centimeters from molded angles 7, that is, at approximately ten centimeters from the extremity of adhesive strip 8.

According to an essential feature of the invention, each pull tab 12 is a double tab, composes of two juxtaposed tab portions 15 on either side of an area 16 cut into protective film 11. Tab portions 15 may be any shape. However, they are preferably identical and form two half-tabs 17.

Preferably the two tab portions 15 originate from a single mother strip 12 separated into two portions at the same time as the slit is made in protective film 11. However, the two pull tab portions 15 may also consist of two complete tabs that are juxtaposed, positioned on either side of slit 16.

According to the invention, each section portion 2 is then provided with at least two lengths 18 of protective film 11 that will be torn off, the ends of which have a pull tab portion 15, preferably a half pull tab 17.

According to the preferred variation shown, the pull tab portions 15 are placed about ten centimeters from angle connections 7. The lengths of film 18 are of different sizes on either side of slit 16, with a small length 19 extending near section extremity 6 and a long length 20 located on the other side of the slit.

Nevertheless, the lengths 18 of film may obviously be any size, identical or different.

Figure 6:
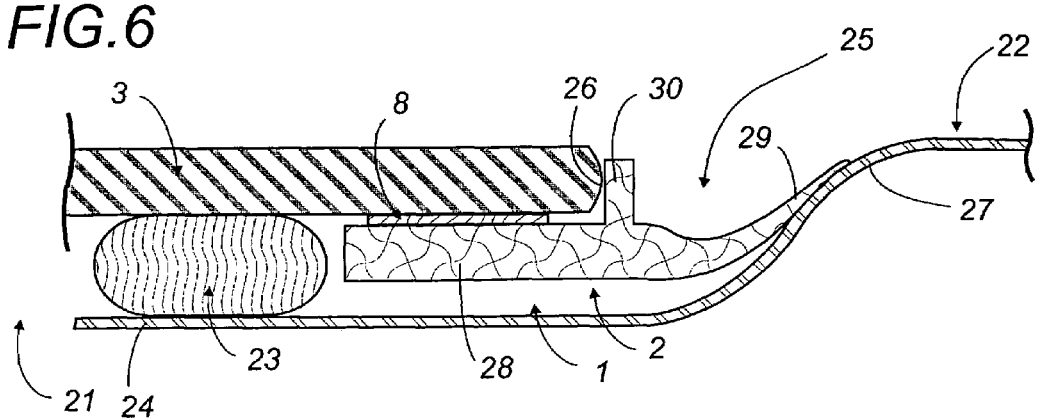
FIG. 6 is a schematic transverse cross-section of an example showing the application of a section according to the invention onto a fixed automobile window.

FIG. 6 shows an exemplary application of frame 1 of the invention used as a perimeter frame covering a windshield.

In the conventional way, a windshield 3 is placed on an opening 21 formed in body 22 of the vehicle. Windshield 3 is attached by gluing it, using a bead of glue 23 applied to a groove 24 in the metal of body 22 bordering the opening to be covered.

Due to manufacturing allowances, a gap 25 exists between flange 26 of the window and shoulder 27 at the beginning of the groove 24 in the body.

In order to mask this gap 25, which is visibly and esthetically objectionable, windshield 3 is equipped with a frame cover 1 according to the invention that borders it on three sides using its three section portions 2.

As the cross-section in FIG. 6 shows, each section portion 2 comprises one essentially horizontal longitudinal wall 28 designed to rest on the window rim 3.

Wall 28 extends toward the car body into a flexible wall that is longitudinal and generally horizontal, constituting a flexible masking lip 29, the unattached end of which is designed to rest on the metal of body 22 to mask the unattractive gap 25 between the window and the body.

From the back surface of horizontal longitudinal wall 28 extends a longitudinal blocking rib 30 that is preferably essentially vertical. This rib 30 is designed to block flange 26 of window 3 in order to position frame 1 correctly when it is put in place.

Section frame of the invention is attached to window 3 by means of a double-face adhesive strip 8, one surface 10 of which adheres to window 3 and the other surface 9 of which adheres to the back surface of longitudinal wall 28.

It should be noted that the invention is not limited to the realm of frames for enhancing fixed windows, but concerns any applied element comprising a double-face adhesive covered by a protective film that must be removed before gluing by means of a pull tab consisting of two pull tab portions positioned on either side of a slit in the protective film.

For this reason the section may assume a form that is different from what has been described above and it may comprise more or fewer elements than the examples described above, since the characteristics of the section are selected so as to be suitable for the application at hand.

Figure 7:
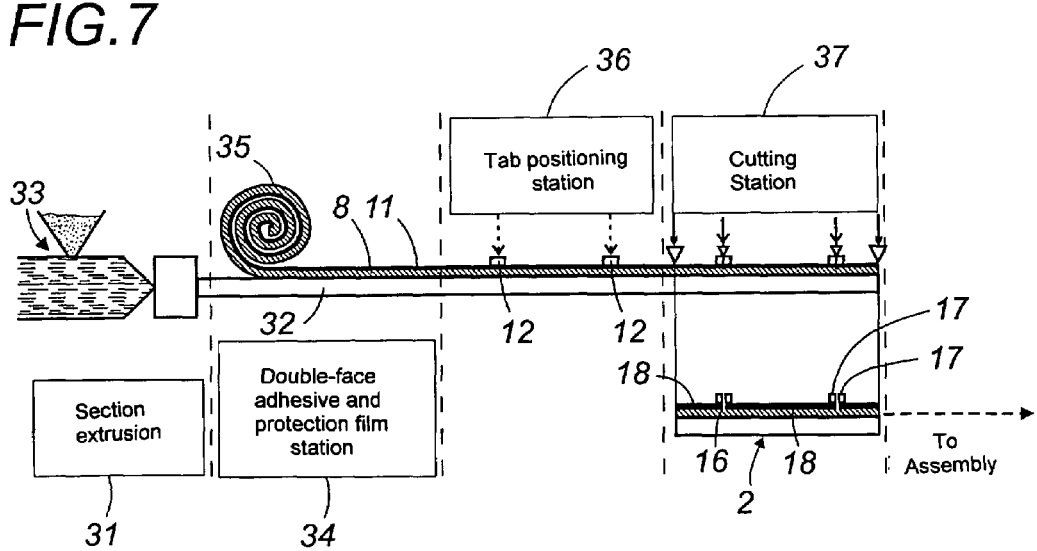
FIG. 7 is a schema showing an example of an automated production line for manufacturing sections using the method of the invention.

FIG. 7 is a schematic illustration of a preferred example of an automated manufacturing line for producing section portions according to the invention, using the method of the invention for positioning and forming pull tabs.

In a first step 31, a continuous section length 32 is extruded using a conventional extrusion apparatus 33 with features that are suitable for its ultimate application.

In a second step 34, a continuous strip of double-face adhesive 8, with its upper surface 10 covered by a protective film 11, is applied to the back surface, also called the attachment surface, of section 32.

To do this, a spool 35 of double-face adhesive covered with protective film is disposed after the outlet of extruder die 33. Spool 35 unrolls simultaneously as extruded section 32 moves along and the strip issuing from the spool becomes continuously glued to the section surface on one of its adhesive surfaces.

Forming a satisfactory contact between the adhesive strip and the section, as well as exerting enough pressure to achieve satisfactory adhesion of the strip to the section, are achieved using means known to a person skilled in the art and are not shown, nor will they be described, in this application.

In step 34, positioning the double-face adhesive 8 and its protective film 11, can obviously be achieved using any other conceivable means. For example, it is possible to position double-face adhesive 8 first, then protective film 11 in a second operation; this could be done using two successive spools, for example. It is also conceivable to perform a coextrusion, simultaneously with section 32, of adhesive material 8 and/or protective film 11.

Next, section 32 passes to a tab positioning station 36 wherein pull tabs 12 are positioned transversely to section 32 and attached to protective film 11, preferably by gluing or soldering. The frequency of positioning complete tabs 12 is synchronized with the progression of section 32, that is, with extrusion speed, so the interval between two successive tabs corresponds to a predetermined spacing specific to the characteristics desired for the final product.

In the example in FIG. 7, tab positioning station 36 is shown placing two pull tabs 12 simultaneously. Obviously, it would be possible to place only one at a time or any number, depending upon the characteristics desired for the resulting section portion.

Section 32 finally reaches a cutting station 37 where the continuous length of section 32 is divided into section portions 2 of appropriate length.

Simultaneously, pull tabs 12 are automatically separated into two tab portions 15 by a slit 16 that divides tab 12 and protective film 11 at the same time. Preferably the cut is made essentially at the middle of tab 12. The result is two half-tabs 17, each joined at the extremity to a length of protective film 18 that will be torn off.

To ensure that it penetrates all the way through tab 12 and film 11, slit 16 may extend as far as adhesive 8. However, section 32 must be left intact. Nevertheless, double-face adhesive strip 8 is thick enough that a person skilled in the art can easily regulate this and still account for manufacturing allowances.

The resulting section portions 2 may then be collected for the final assembly and shaping steps, such as molding and soldering, for example.

FIG. 7 shows the cutting of pull tabs and protective film taking place at cutting station 37, that is, occurring simultaneously with the division of continuous section 32 into section portions 2. It is also possible for this cutting operation to take place at an independent cutting station placed between tab positioning station 36 and cutting station 37, or placed after cutting station 37.

It is also conceivable that this cutting could take place before tab positioning station 36 and would then concern only protective film 11. Step 36 would then consist of depositing two complete tabs on either side of slit 16.

The automated method of positioning and forming pull tabs according to the invention thus comprises the following steps:

cutting protective film 11, in the middle of adhesive zone, so as to obtain two lengths of protective film 18 designed for removal;

attaching to protective film 11 two pull tabs 15, transversely relative to section 32 so that their free extremity 14 extends laterally beyond adhesive 8 on either side of slit 16 in protective film 11 and essentially at the extremity of each length 18 of protective film.

In every instance and according to a characteristic of the invention, this cutting operation takes place before the later assembly steps using molding, soldering, or the like.

The invention claimed is:

1. An automated method for positioning and forming pull tabs used to facilitate a subsequent removal of a protective film (11) covering an unattached surface (10) of a strip of double-face adhesive (8) extending along a continuously extruded section (32), the pull tabs comprising a first portion (13) for attachment to the protective film and a free extremity (14), the method, performed on the extrusion line, comprising the steps of;

attaching the pull tab (12) to the protective film (11) in a middle of an adhesive zone and transversely relative to the continuously extruded section (32) so that the free extremity (14) extends laterally beyond the adhesive (8);

cutting the pull tab (12) and the protective film (11) so as to individualize the pull tab and the protective film in a same location in order to obtain two tab portions (15), each tab portion joined to an extremity of a length of protective film (18) designed to be torn away; and assembling section portions by one or more of molding and soldering.

2. The method for positioning and forming pull tabs according to claim 1, wherein the attachment step is one of a gluing or soldering step.

3. The method for positioning and forming pull tabs according to claim 1, wherein cutting the pull tab (12) and the protective film (11) occurs essentially at a middle of the pull tab (12), resulting in two half-tabs (17).

4. The method for positioning and forming pull tabs according to claim 1, wherein during the step of cutting the tab (12) and the protective film (11), a slit (16) is made that extends through the adhesive (8).

5. The method for positioning and forming pull tabs according to claim 1, wherein the step of cutting the tab (12) and the protective film (11) occurs simultaneously with dividing the continuous section (32) into section portions (2).

6. An automated method for positioning and forming pull tabs used to facilitate removal of a protective film (11) covering a free surface (10) of a strip of double-face adhesive (8) extending along a continuously extruded portion (32), the pull tabs comprising one portion (13) for attachment to the protective film and one free extremity (14), the method, performed on the extrusion line, comprising the steps of;

cutting the protective film (11) in a middle of an adhesive zone, so as to obtain two lengths of protective film (18) designed to be torn off;

attaching to the protective film (11) two pull tabs (15) transversely relative to the continuously extruded section (32) so that the free extremity (14) extends laterally beyond the strip of double-face adhesive (8) on either side of a slit (16) in the protective film (11) and essentially at the extremity of each of the two lengths (18) of protective film; and assembling a section by one of molding and soldering.

* * * * *